US008172918B2

(12) United States Patent
Grosche et al.

(10) Patent No.: US 8,172,918 B2
(45) Date of Patent: May 8, 2012

(54) FILTER APPLIANCE

(75) Inventors: Stefanie Grosche, Dudenhofen (DE);
Thomas Ranker, Homburg (DE)

(73) Assignee: Mann+Hummel GmbH, Ludwigsburg (DE)

(*) Notice: Subject to any disclaimer, the term of this patent is extended or adjusted under 35 U.S.C. 154(b) by 85 days.

(21) Appl. No.: 12/720,999

(22) Filed: Mar. 10, 2010

(65) Prior Publication Data
US 2010/0162673 A1    Jul. 1, 2010

Related U.S. Application Data

(63) Continuation of application No. PCT/EP2008/061847, filed on Sep. 8, 2008.

(30) Foreign Application Priority Data

Sep. 11, 2007  (DE) .................... 20 2007 012 690 U

(51) Int. Cl.
*B01D 53/00* (2006.01)
(52) U.S. Cl. ................ 55/480; 55/482; 55/497; 55/500; 55/504; 55/521
(58) Field of Classification Search ............... 55/480, 55/482, 49, 500–504, 497, 521
See application file for complete search history.

(56) References Cited

U.S. PATENT DOCUMENTS

| 5,753,117 | A  | * | 5/1998 | Jiang ............................. 210/232 |
| 6,152,978 | A  | * | 11/2000 | Lundquist .................... 55/385.1 |
| 6,419,718 | B1 | * | 7/2002 | Klug et al. ...................... 55/320 |
| 2006/0081528 | A1 | * | 4/2006 | Oelpke et al. .............. 210/493.1 |

FOREIGN PATENT DOCUMENTS

| DE | 19534036 | 3/1997 |
| EP | 1222951 | 7/2002 |
| EP | 1595589 | 11/2005 |
| EP | 1649920 | 4/2006 |
| WO | WO9500232 | 1/1995 |
| WO | WO0231340 | 4/2002 |

OTHER PUBLICATIONS

PCT search report of PCT/EP2008/061847. German patent office search report of DE 202007012690.5.

* cited by examiner

*Primary Examiner* — Jason M Greene
*Assistant Examiner* — Karla Hawkins
(74) *Attorney, Agent, or Firm* — James Hasselbeck

(57) ABSTRACT

A filter device has a filter housing and a filter element that is exchangeably arranged in the filter housing. A housing cover for closing the filter housing is provided. Interacting locking elements are arranged on the filter element and on the housing cover wherein the interacting locking elements have a locked position and a release position and are moveable between the locked position and the release position.

12 Claims, 4 Drawing Sheets

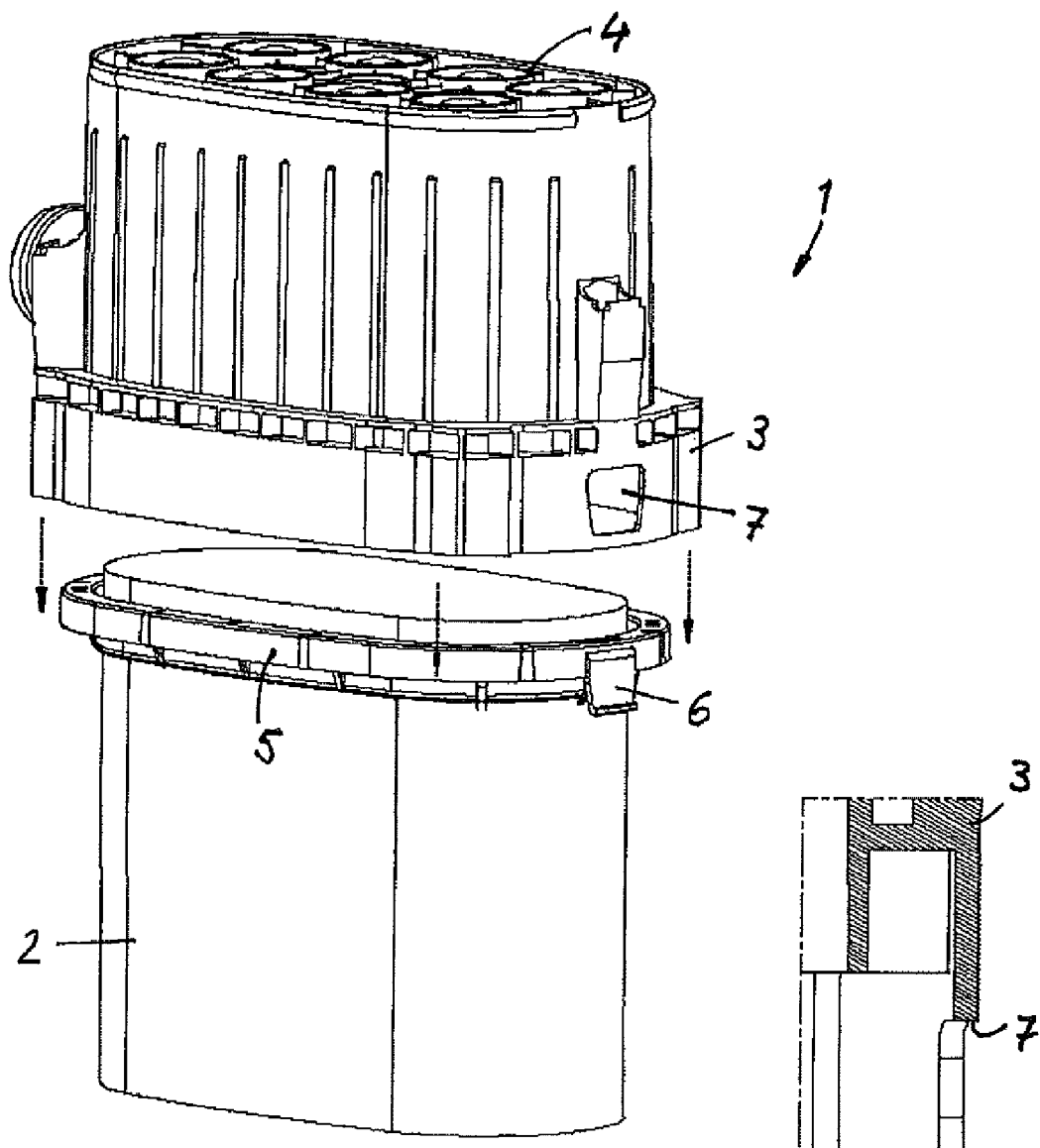
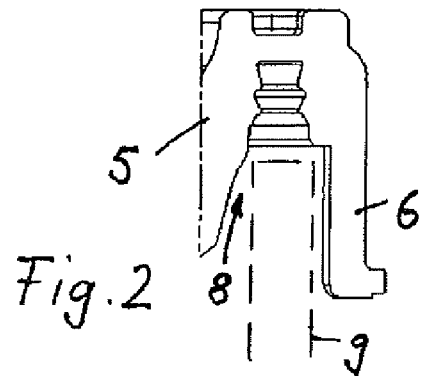
Fig. 1
Fig. 2

FILTER APPLIANCE

CROSS REFERENCE TO RELATED APPLICATIONS

This application is a continuing application of international application Ser. No. PCT/EP2008/061847 having an international filing date of 8-Sep.-2008, the contents of which are incorporated herein by reference in its entirety, which international application claims the benefit under 35 USC 119 of the filing date of foreign application DE 20 2007 012 690.5 filed in Germany on 11-Sep.-2007.

TECHNICAL FIELD

This disclosure relates to a filter device with a filter element that is exchangeably insertable into a filter housing that can be closed by a housing cover.

BACKGROUND OF THE INVENTION

The invention concerns a filter device with a filter element that is exchangeably insertable into a filter housing that can be closed by a housing cover.

EP 1 364 695 A1 discloses an air filter that is used for filtering combustion air in the intake manifold of an internal combustion engine. The air filter is comprised of a filter cartridge that is inserted into a filter housing and that is flowed through axially by the combustion air to be filtered. The filter housing can be closed by a housing cover that in the mounted state is secured by means of closure elements on the filter housing. The housing cover is positioned on a circumferential side of the filter housing so that when the housing cover is removed the filter cartridge can be radially inserted into the filter housing or removed therefrom. In order to facilitate insertion and removal of the filter cartridge the filter element is secured in its own support housing on which a bracket is arranged that facilitates handling of the filter cartridge.

SUMMARY OF THE INVENTION

It is therefore an object of the present invention to facilitate with simple constructive measures the insertion and removal of the filter element into or out of the filter housing.

In accordance with the present invention, this is achieved in that on the filter element and on the housing cover matching locking means are arranged that are moveable between a locked position and a release position and vice versa.

In the filter device according to the invention on the filter element as well as on the housing cover locking means are arranged that can be moved into a common locked position in which the filter element and the housing cover are fixedly interlocked. The matching locking means can be moved into a release position in which the filter element is detached from the housing cover.

This embodiment makes it possible that, for installation, the filter element is already locked on the housing cover outside of the receptacle provided in the filter housing and inserted into the filter housing while in the locked state on the housing cover. During regular operation of the filter device the locking action between the filter element and the housing cover remains intact. For removing the filter element from the filter housing only the housing cover together with the filter element locked thereat must be lifted. Removal of the housing cover and removal of the filter element therefore coincide and are carried out in a single step. Mounting as well as demounting can therefore be performed faster and simpler.

The locking means of the filter element and the housing cover are in principle independent of the closure elements or locking devices with which the housing cover in the mounted state is secured on the filter housing. Still, it may be expedient to use the locking means of the filter element and the housing cover also for securing the housing cover on the filter housing.

According to an advantageous embodiment at least one locking means, either the locking means on the filter element or the locking means on the housing cover, optionally also both locking means, in the mounted state of the filter device are supported on the filter housing and secured by the filter housing in the locked position. In this way it is ensured that in the mounted state the filter element cannot become detached accidentally from the housing cover but, over the entire operating time, is secured on the housing cover so that at the time of the next scheduled removal of the filter element from the filter housing only the housing cover must be detached from the filter housing and removed so that at the same time also the filter element can be removed from the receptacle in the filter housing. Vibrations, impact or the like also cannot cause an accidental detachment or release of the connection between the housing cover and filter element.

This securing action is advantageously realized in that the rim of the end face of the filter housing is inserted into an insertion opening that is radially delimited by a locking means. For example, one of the locking means can be embodied as a tab which in the locked position engages a correlated recess at the other component wherein the tab delimits radially the insertion opening. When the tab, for example, is arranged on the filter element, in particular on a radially projecting support ring of the filter element, and is pushed in the locked position into a recess, located at a circumferentially extending rim of the housing cover, the insertion opening for the filter housing is located at the radial inner side of the tab wherein with axial insertion of the rim at the end face of the filter housing into the insertion opening a radial movement of the tab is prevented and the tab therefore cannot be transferred into the release position. Only in the open state, i.e., the housing cover removed from the filter housing and the filter element removed at the same time, the tab can be pushed radially inwardly into the release position in which the housing cover and the filter element can be axially pulled apart from one another. This can be done without problems because the filter housing no longer projects into the insertion opening and in this way no longer presents an obstacle for transferring the tab from the locked position into the release position.

In principle, it is however also possible that the tab is not arranged on the filter element or the support ring of the filter element but on the housing cover. The locking element on the filter element is then formed accordingly as a recess into which the tab projects in the locked position.

The support ring that frames the filter element and is fixedly connected thereto and on which one of the locking means is arranged, expediently has a smaller outer diameter than the filter housing so that the support ring arranged advantageously at the end face can be received in the filter housing. The circumferentially extending insertion groove is located between support ring and the locking means arranged externally on the support ring.

The housing cover, in addition to its function of providing the receptacle for the filter element, can take on an additional task. For example, this may concern the integration of a prefilter into the housing cover so that the fluid to be filtered first passes through the prefilter and subsequently through the filter element within the filter housing that takes on the task of a main filter. The prefilter and the main filter in this embodiment are positioned axially behind one another in the flow path of the fluid to be filtered.

The filter device can be used for filtering gaseous fluids, especially for the filtration of combustion air for internal combustion engines, as well as, for example, for the filtration of the fuel or oil.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 shows in a perspective illustration a filter device through which the fluid flows in the axial direction, comprised of a filter element with oval cross-section and a housing cover in which a preseparator is integrated, wherein on the filter element a support ring is arranged to which is secured a tab that forms a locking means that is to be inserted into a correlated recess in the housing cover;

FIG. 2 shows a section of the housing cover and filter element in the area of the locking means that are to be moved into a locked position;

In the Figures same components are identified with same reference numerals.

Figure 3:
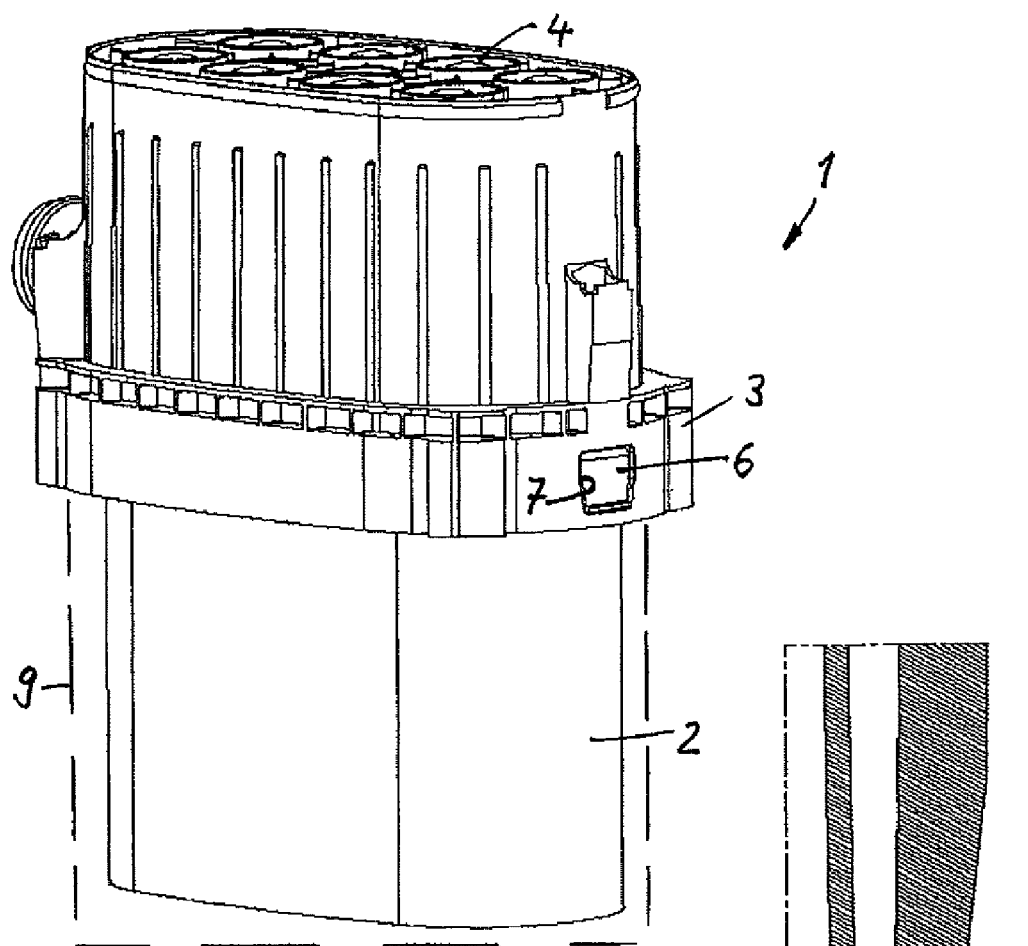
FIG. 3 shows the filter element and housing cover in locked position and in the inserted state within the filter housing (indicated only schematically)

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a filter element that is exchangeably insertable into a filter housing that can be closed by a housing cover as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The filter device 1 illustrated in FIG. 1 is in particular an air filter that is inserted into the intake manifold of an internal combustion engine for filtration of the supplied combustion air. The filter device 1 comprises a filter element 2 that has an oval cross-section and through which the fluid to be filtered flows in the axial direction. The filter device 1 has moreover correlated therewith a housing cover 3 in which a prefilter 4 is integrated which is embodied as a cyclone preseparator. The prefilter 4 is axially positioned upstream of the filter element 2 so that coarse dirt particles are first separated in the prefilter 4 before the fluid flows through the main filter element 2.

In FIG. 1 the filter element 2 and the housing cover 3 are illustrated in the detached state. For assembly, first the filter element 2 and the housing cover 3 are connected or mounted to one another and subsequently the preassembled module, comprised of the housing cover and filter element, is inserted into or placed onto the filter housing 9 (shown in phantom on FIG. 3).

The connection between the filter element 2 and the housing cover 3 is realized by means of locking means that in the illustrated embodiment are embodied as a tab 6 on a support ring 5 that is connected to the filter element 2 and as a recess 7 in the housing cover 3. The support ring 5 surrounds or frames the circumferential outside surface of the filter element 2 in the area of its end face neighboring the housing cover 3. The outer diameter of the support ring 5 is expediently smaller than the outer diameter of the filter housing into which the filter element 2 is inserted.

As is shown in FIG. 2, the tab 6 which is formed as a unitary part of the support ring 5 delimits an insertion opening 8 that is formed between the outer wall of the support ring 5 and the inner wall of the tab 6 wherein the tab 6 in a locked state extends approximately in axial direction and thus parallel to the outer wall of the filter element 2. As indicated in FIG. 2 in dashed lines, the insertion opening 8 serves for receiving the end face of the filter housing 9.

Figure 4:
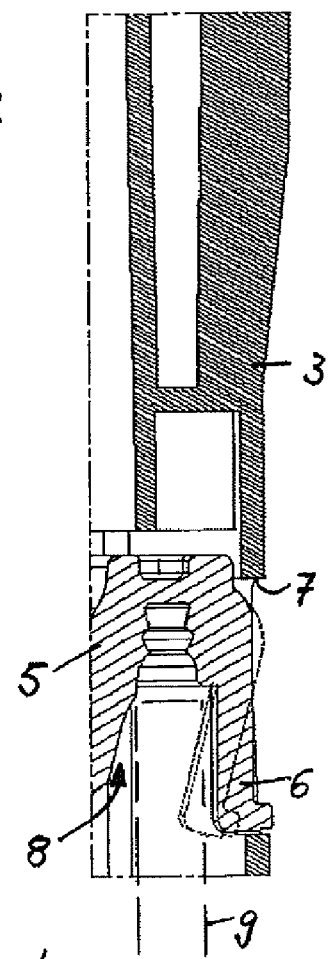
FIG. 4 shows a section of the area of the locking means that lock the housing cover and the filter element, illustrated in locked position.
Figure 5:
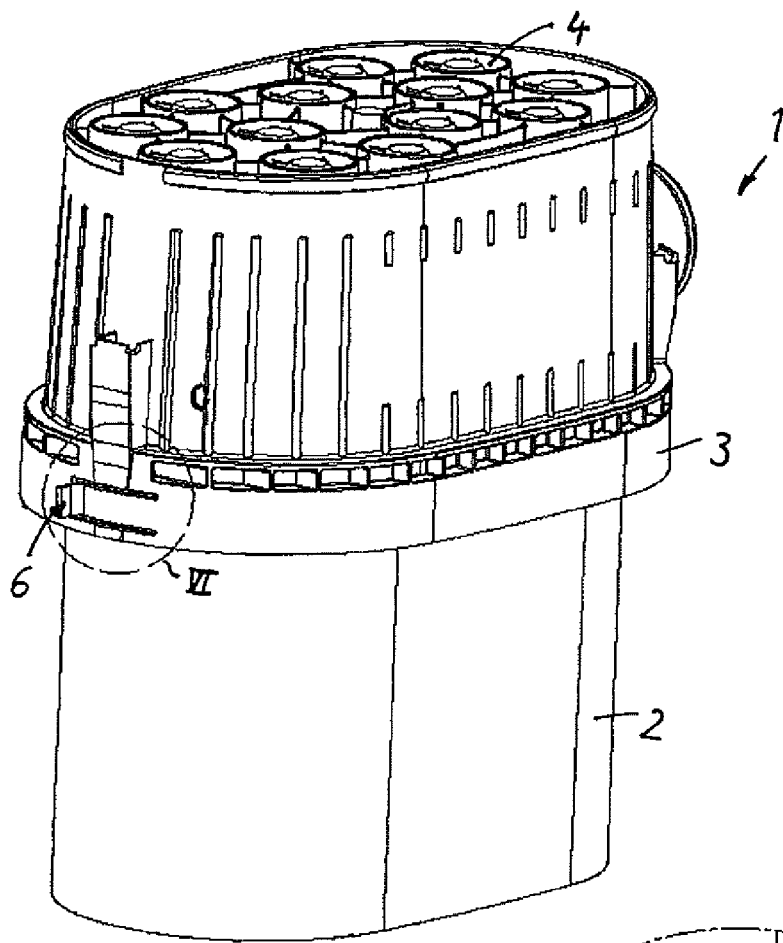
FIG. 5 shows a filter device with a filter element and a housing cover with integrated prefilter in a further embodiment of the locking means by means of which the housing cover and the filter element are to be connected to one another.
Figure 6:
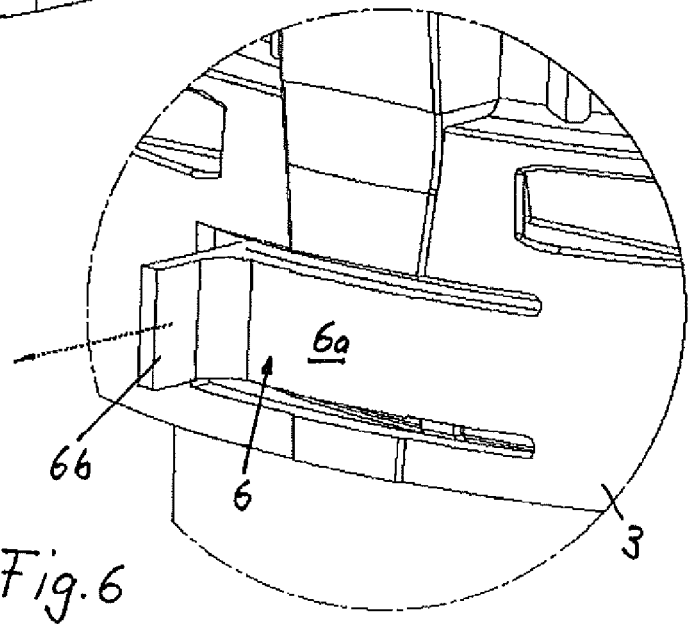
FIG. 6 shows detail VI of FIG. 1 in enlarged illustration.
Figure 7:
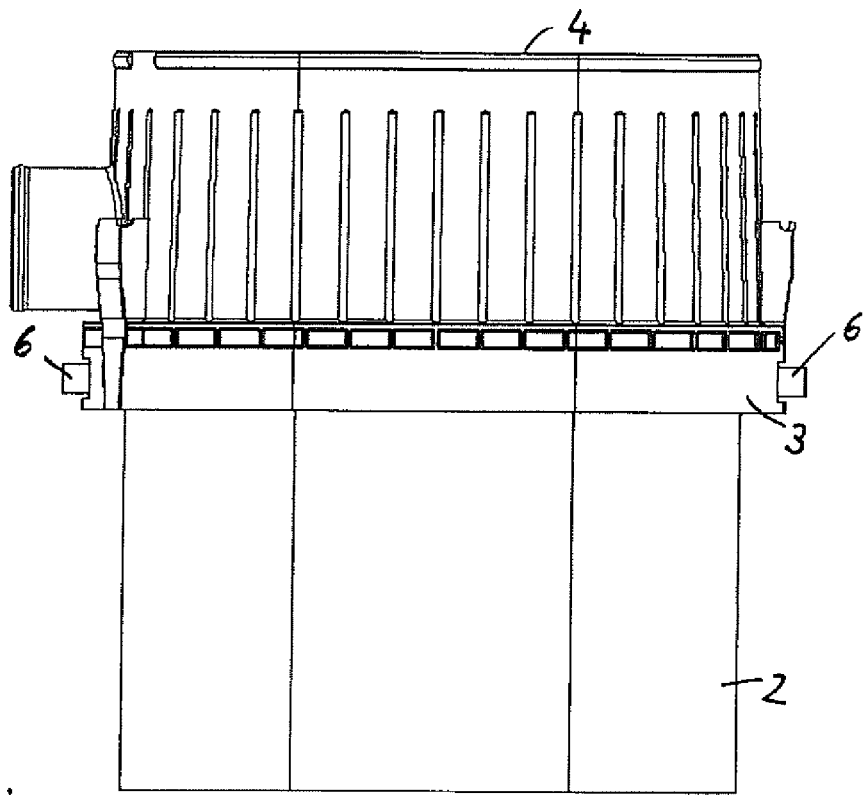
FIG. 7 shows a side view of the filter element and the housing cover in the locked state.
Figure 8:
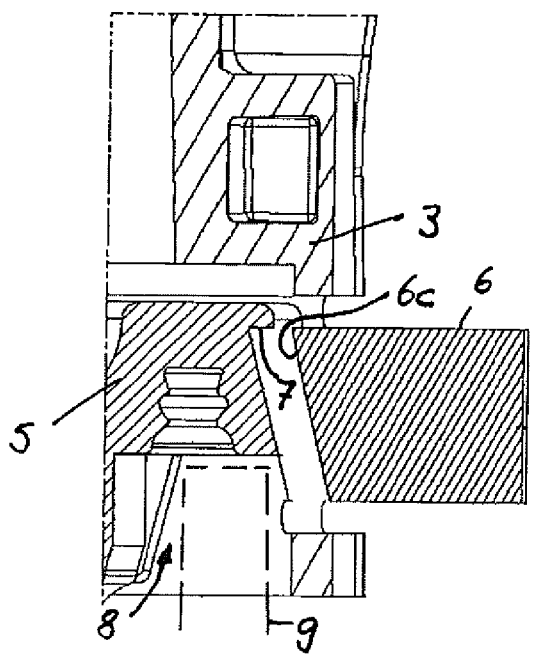
FIG. 8 shows a section of the locking means, illustrated in the release position.
Figure 9:
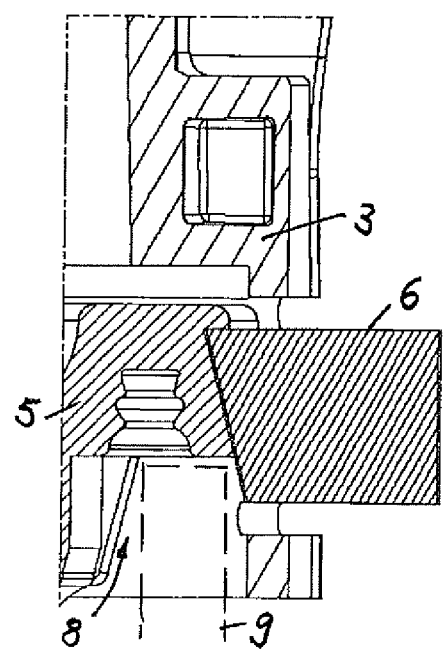
FIG. 9 shows in an illustration corresponding to FIG. 8 the locking means in the locked position.

In FIGS. 3 and 4 the filter device 1 is illustrated with the filter element 2 and the housing cover 3 in the locked state. In the locked position the tab 6 projects into the recess 7 formed in the housing cover 3. Expediently, at opposed sides of the housing cover 3 a tab 6 and a correlated recess 7 are provided, respectively. The tab 6 is force-loaded by its own tension into the locked position. The locked position of the tab 6 is indicated by the solid line illustration with approximately axis-parallel orientation or parallel position relative to the wall surface of the filter element 2 in which the tab 6 lockably engages the recess 7. In FIG. 4, in addition the release position of the tab 6 is shown in dashed lines in which the tab 6 is bent radially inwardly in the direction of the insertion opening 8 to such an extent that the recess 7 is released by tab 6 and filter element 2 and housing cover 3 can be axially pushed away from one another. Because of its own tension, tab 6 is however in a stable locked position as soon as the position in the recess 7 has been reached.

Advantageously, the adjustment of the tab 6 out of the locked position into the release position is possible only when the insertion opening 8 is released by the filter housing 9 (i.e., the housing 9 is no longer blocking the inward movement of the tab 6 in the direction of the insertion opening 8). As illustrated in FIG. 4, the release position of the tab 6 cannot be achieved when the end face of the filter housing 9 is inserted into the insertion opening 8.

In FIGS. 5 to 9 a further embodiment for a filter device 1 is illustrated. The filter device is substantially of the same configuration as that of the first embodiment so that with this respect reference is made to the description of the first embodiment. Differences reside, however, in the embodiment of the locking means by means of which the filter element 2 and the housing cover 3 are locked onto one another. The locking means are comprised of another embodiment of a tab 6 and a recess 7 in which the tab 6 is positioned on the outer circumference of the housing cover 3 adjacent to the end that is facing the filter element 2. The tab 6 is integrated into the wall of the housing cover and is comprised of a locking section 6a that extends in the circumferential direction about an angle segment. The locking section 6a is connected at one one end as a monolithic part with the housing cover 3 while at the opposite end there is no connection to the housing cover. At this free end of the tab 6 a grip 6b is formed as a monolithic part with the tab that projects radially outwardly from the tab 6 and housing cover 3. On the radial inner side (see FIG. 8, FIG. 9) on the tab 6 a locking edge 6c is formed which in the locked position projects into and lockably engages a locking recess 7 that is provided on the radial external side of the support ring 5 that is connected fixedly to the filter element 2. The locking recess 7 is embodied as a locking step that, in the axial direction, enables a positive locking connection between the locking edge 6c and the support ring 5.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device comprising:
   a filter housing;
   a filter element that is exchangeably installable into said filter housing though an opening in said housing;
   a support ring fixedly connected to and framing a circumferential outside surface of said filter element;
   a housing cover removably closing over said opening of said filter housing; and
   an interacting locking means having a portion arranged on said filter element and another portion arranged on said housing cover;
   wherein said locking means is operable between a locked position in which said housing cover and filter element are lockably mounted together as a unit, and a released position in which said housing cover and filter element are released and disengageable from each other,
   wherein a first one of said locking means is secured to said support ring and lockably engaging a second one of said locking means secured to said housing cover.

2. The filter device according to claim 1, wherein a first one of said locking means in a mounted state of the filter device is held in said locked position by a portion of said filter housing while said housing cover is installed on said filter housing.

3. The filter device according to claim 2, wherein said first locking means in said mounted state is configured to rest against an exterior side of said filter housing.

4. The filter device according to claim 1, wherein said locking means are movable in a radial direction between said locked position and said released position.

5. The filter device according to claim 1, wherein said support ring has an outer diameter that is smaller than an outer diameter of said filter housing.

6. The filter device according to claim 1, wherein said first one said locking means is a recess and said second one of said locking means matching said first locking means is a tab engaging said recess.

7. The filter device according to claim 6, wherein said tab is force-loaded by built-in stress in a direction of said locked position to radially move said tab into said locked position.

8. The filter device according to claim 6, wherein said recess is provided on said housing cover and wherein said tab is provided on said filter element, wherein said tab delimits an insertion opening for an end face of said filter housing.

9. The filter device according to claim 6, wherein said tab is provided on said housing cover and wherein said recess is provided on a support ring of said filter element wherein an insertion opening for an end face of said filter housing is delimited by said support frame.

10. The filter device according to claim 6, comprising a prefilter integrated into said housing cover.

11. The filter device according to claim 1, wherein said first locking means is unitary with said support ring.

12. The filter device according to claim 11, wherein said second locking means is a monolithic with said housing cover.

\* \* \* \* \*